UNITED STATES PATENT OFFICE.

ALADAR von LASZLOFFY, OF PEORIA, ILLINOIS.

PROCESS OF RECOVERING BY-PRODUCTS FROM DISTILLERY-SLOP.

1,147,770.  Specification of Letters Patent.  Patented July 27, 1915.

No Drawing. Original application filed August 25, 1911, Serial No. 645,912. Divided and this application filed October 20, 1913. Serial No. 796,149.

*To all whom it may concern:*

Be it known that I, ALADAR VON LASZLOFFY, citizen of the United States, residing at Peoria, in the county of Peoria and State of Illinois, have invented certain new and useful Improvements in Processes of Recovering By-Products from Distillery-Slop; and I do hereby declare that the following is a full, clear, and exact description of the invention, which will enable others skilled in the art to which it appertains to make and use the same.

This invention relates to the recovery of by-products from distillery-slop and particularly to a process by which groups of said by-products are separated from the slop and from each other. Its object is to recover from distillery-slop separate groups of by-products by treating said slop or preparations derived from distillery-slop with a plurality of solvents in succession.

It is known that distillery-slop or vinasses contain a number of valuable products among which are glycerin, organic acids and fats.

I have described in copending patent applications methods of treating distillery-slop or preparations of the same with a solvent, for instance alcohol, the aim of which is to separate a mixture of the products from the slop, this mixture being afterward separated into groups of products, individual products being finally separated from the groups.

In the present process the distillery slop or preparations of the same are treated first with a solvent that dissolves but a small number of by-products following which a different solvent is used to extract other products, the by-products being divided into groups from the very beginning of the treatment. This method of extraction, which may be characterized as fractional extraction, facilitates the recovery of the individual by-products in a state of greater purity.

In making use of the general principle of fractional extraction of the by-products from distillery-slop I have found it most practical to use first a solvent which has a high fat dissolving power, that is, one that will dissolve the largest possible amount of said fat but which solvent will not mix with glycerin. The typical fat solvents answer the requirements of this process and I have found those to be most economical which besides dissolving the fat, also dissolve the lactic and the succinic acids, the separation of the fat from these organic acids being afterward very easily effected. Such solvents may be, for instance, ether, chloroform, benzol, benzin, other hydrocarbons, the chlorderivates of hydrocarbons or mixtures of them having the described property to some degree and it may be stated that the greater the affinity of the solvent for water the more quickly it will extract the organic acids, although the extracted products will be less pure. The residue resulting from the extraction through the use of the first solvent is treated with another solvent, as for instance with an alcohol or mixtures thereof with other solvents, but wherein the character of the alcohol predominates. By extracting said residue with this form of solvent a new solution is obtained containing principally glycerin, besides other substances. It is obvious that the fractional extraction can be extended further by treating the residue of the second extraction with still another solvent, for instance with an alcohol-water-mixture, or mixtures.

Either the whole slop or parts of the same may be treated in the described manner, and the slop or its parts may be changed in form for the extraction as by evaporating, drying, or mixing it with an absorbent material, or other physical or chemical agents may be used. In referring to preparations of distillery-slop or mixtures of substances derived from distillery slop I mean the various forms into which the slop or parts of the slop containing the by-products may be changed by physical or chemical means.

While the whole slop may be treated with solvents by the process set forth, it is of course more practical to bring the by-products into a more concentrated form by eliminating water or other parts of the slop to reduce the volume to be treated.

The following will set forth the preferred manner of practising the present process and will also serve to better explain the general principle of said process: 30,000 gallons of distillery-slop which represent the residue of distillation of fermented distillery-mash derived from 1,000 bushels of grain, are separated by any well known means into a solid part and a liquid part. The liquid part is concentrated in a vacuum-evaporator and the resulting syrupy-slop is mixed with the solid part of the slop after which the mixture is dried. This dried slop is now reduced to a granular form and placed in a suitable extraction apparatus. Such an apparatus may consist of a percolator in which the dried slop can be treated with the solvent, and a still in which the solution coming from the percolator is boiled, and a reflex-cooler that condenses the vapors arising from the still; the condensed solvent being returned to the percolator. Ethyl ether or similar solvent to the amount of substantially the volume of that of the dried slop is placed in the still and when caused to boil its vapor after passing into the reflex-cooler percolates through the dried slop and returns to the still. This operation is made continuous or until the slop is practically exhausted of the organic acids. The solution in the still is now withdrawn and contains fat and lactic and succinic acids in a state of high purity. The still is now filled with alcohol which is boiled and the resulting alcohol-vapor arises into the cooler where it is condensed and made to pass through the previously treated slop which now naturally contains a large quantity of ether. The mixture of alcohol and ether percolates through the material back into the still and again being sent to and through the material as before. The new solution in the still is of a darker color than that obtained in the first treatment with ether and its principal content is glycerin as the by-product, together with impurities in the shape of other obtainable substances. The glycerin is easily soluble in the mixture of alcohol and ether and as soon as the material is exhausted of it the solution is withdrawn. The solvent is then driven out of the residue and recovered. This residue in consequence of its mode of treatment is very rich in protein-substances by reason of the fact that the extraction of the fat, organic acids and glycerin have increased the relative amount of protein therein and it represents therefore a valuable concentrated cattle-feed.

The treatment of the two solutions of by-products obtained by the process shown in this example do not form a part of the present application but are described and claimed in separate copending applications and the subject matter of this application is divided from my former application for a process of recovering by-products from distillery slop, Serial No. 645,912 filed in the U. S. Patent Office on the 25th day of August 1911.

By the use of the term "distillery slop" I means the residue of distillation obtained in the manufacture of alcohol from any raw material used in the manufacture of alcohol.

Having described my invention I claim:—

1. The process of recovering a plurality of solutions of by-products from a mixture of substances derived from distillery slop consisting in treating said mixture of substances first with a fat-solvent capable of dissolving lactic acid and succinic acid and which has a tendency to repel glycerin, separating the solution resulting from this treatment from the residue, then treating the residue with an alcoholic solvent, and again separating the solution from the insoluble part.

2. The process of recovering a plurality of solutions of by-products from a mixture of substances derived from distillery-slop consisting, first, in passing through a concentrated mixture of the same a solvent capable of dissolving fat and lactic and succinic acids and having a tendency to repel glycerin, and, second, passing an alcoholic solvent through the said concentrated mixture.

In testimony whereof I affix my signature, in presence of two witnesses.

ALADAR von LASZLOFFY.

Witnesses:
L. E. SUTHERLAND,
L. M. THURLOW.